United States Patent
Plotzitzka et al.

(10) Patent No.: US 10,279,784 B2
(45) Date of Patent: May 7, 2019

(54) JOINING METHOD

(71) Applicant: Henkel AG & Co. KGaA, Duesseldorf (DE)

(72) Inventors: Joachim Plotzitzka, Pfinztal (DE); Hermann J. Schwarze, Glattbrugg (CH)

(73) Assignee: Henkel AG & Co. KGaA, Duesseldorf (DE)

( * ) Notice: Subject to any disclaimer, the term of this patent is extended or adjusted under 35 U.S.C. 154(b) by 555 days.

(21) Appl. No.: 15/069,359

(22) Filed: Mar. 14, 2016

(65) Prior Publication Data

US 2016/0193988 A1 Jul. 7, 2016

Related U.S. Application Data

(63) Continuation of application No. PCT/EP2014/068241, filed on Aug. 28, 2014.

(30) Foreign Application Priority Data

Sep. 16, 2013 (DE) .................. 10 2013 218 495

(51) Int. Cl.
   *B60S 5/00* (2006.01)
   *F16B 11/00* (2006.01)
   (Continued)

(52) U.S. Cl.
   CPC .............. *B60S 5/00* (2013.01); *B23P 11/00* (2013.01); *B62D 27/026* (2013.01); *F16B 11/006* (2013.01)

(58) Field of Classification Search
   CPC ......... Y10T 29/49718; Y10T 29/49732; Y10T 29/49734; Y10T 29/49735;
   (Continued)

(56) References Cited

U.S. PATENT DOCUMENTS 3,655,424 A * 4/1972 Orowan .................. F16B 5/04
   29/458
4,219,980 A * 9/1980 Loyd .................... B29C 65/561
   156/92
(Continued)

FOREIGN PATENT DOCUMENTS

DE 1575156 A1 11/1969
DE 19633911 A1 2/1998
(Continued)

OTHER PUBLICATIONS

International Search Report for International Patent Application No. PCT/EP2014/068241 dated Nov. 14, 2014.

*Primary Examiner* — Jonathan P Masinick
(74) *Attorney, Agent, or Firm* — James E. Piotrowski

(57) ABSTRACT

The invention relates to a method for joining a first and second planar part each having an outer surface and an inner surface, wherein in a first step a lowered area is provided at two joining regions of the planar parts, which joining regions face each other, wherein the lowered areas are shaped in such a way that the level of the outer surface in the region of said lowered areas lies below the level of the outer surface of the adjacent regions of the planar parts; wherein in a further step the two planar parts are positioned in relation to each other, while an adhesive is used, in such a way that the two lowered areas form a recess, wherein either one joining region overlaps the other joining region and the adhesive is provided directly between the overlapping joining regions or a joining aid is used, which at least partially overlaps the joining regions of the planar parts, wherein the adhesive is provided between each joining region of the two planar parts and the joining aid; wherein in a further step a mechanical joint is installed in the region of the recess between the joining regions or, if a joining aid is used, between the joining regions and the joining aid in order to (Continued)

provide an assembly connection; wherein in a further step the recess is filled with a filling mass in order to allow leveling with respect to the level of the outer surface of the adjacent regions of the planar parts.

10 Claims, 3 Drawing Sheets

(51) Int. Cl.
*B62D 27/02* (2006.01)
*B23P 11/00* (2006.01)

(58) Field of Classification Search
CPC ......... Y10T 29/49739; Y10T 29/49741; Y10T 29/49744; Y10T 29/49986; F16B 5/00; F16B 5/04; F16B 11/006; B60S 5/00
See application file for complete search history.

(56) References Cited

U.S. PATENT DOCUMENTS

| | | | |
|---|---|---|---|
| 5,375,314 A | 12/1994 | Bora | |
| 6,083,604 A * | 7/2000 | Haraga | F16B 5/00 428/132 |
| 8,181,327 B2 * | 5/2012 | Apfel | F16B 5/02 156/92 |
| 8,663,770 B2 * | 3/2014 | Zalewski | B29C 65/4835 156/304.2 |
| 2003/0005995 A1 * | 1/2003 | Miller | B60S 5/00 156/98 |
| 2012/0297337 A1 * | 11/2012 | St. Denis | G08G 1/168 715/810 |
| 2016/0176364 A1 * | 6/2016 | Reighard | B29C 67/0029 296/1.08 |
| 2018/0119716 A1 * | 5/2018 | Freis | F16B 19/04 |

FOREIGN PATENT DOCUMENTS

| | | |
|---|---|---|
| DE | 19748786 A1 | 5/1999 |
| DE | 19831982 A1 | 1/2000 |
| DE | 10329231 B3 | 3/2005 |
| EP | 0591227 B1 | 6/1995 |
| EP | 0975439 B1 | 6/2004 |
| EP | 1672010 A1 | 6/2006 |
| JP | 2000179513 A * | 6/2000 |
| WO | WO 87-136061 * | 5/1987 |
| WO | 2011048022 A2 | 4/2011 |

* cited by examiner

JOINING METHOD

The invention relates to a method for joining surfaces, particularly made of sheet metal. For example, such a joining method can be used for repairing metallic surfaces, particularly of vehicle bodies.

There are many repair methods for metallic surfaces in the prior art. Sills, damaged by accidents, can be removed from vehicle bodies in the case of a sheet steel structure, for example, in a directional manner or partially and replaced. Repairing sills made of light metal is more difficult. EP 0591227 B1 proposes a repair method for this purpose in which the sill is completely removed by means of oblique cuts and then, with use of sleeve inserts, a replacement girder portion is welded all around to the remaining girder stub.

Repair methods can also be found in the prior art which provide for removing the damaged part, whereby a replacement part is installed with use of an adhesive connection. This is also suitable particularly when it concerns different materials to be connected such as, for example, GRP, aluminum, and sheet steel. For example, DE 19633911 discloses a repair method for a separable sill, which has an inner and outer profile. The outer profile in this case covers the inner profile from the outer side of the vehicle and serves as a deformable protective element for the inner profile and protects it from damage in minor to moderately severe collisions. DE 19633911 for this purpose provides a repair method for such a sill, which calls for the replacement of the outer profile, whereby provisions are also made for bonding together the outer and inner profile.

Further, techniques are known in which a damaged part, for example, of a vehicle body is removed, whereby a replacement part is connected to the remaining vehicle body by means of hybrid bonding. In this case, for example, chemically curing adhesives are used in flowable form, which have a low initial strength, so that mechanical fixing of the replacement part is necessary. Thus, the adhesive connection is often combined with thermal or mechanical joining methods; this is known by the technical term hybrid bonding. Typical methods for combination with adhesion, apart from spot welding, are clinching, blind riveting, punch riveting, and special bolting methods.

In most applications, the connection sites, also known by the technical term seams, between the replacement part and, for example, the vehicle body are overcoated, and the seams naturally are to be and to remain invisible subsequently. Coatings of body solder are known. Because of the temperatures needed for the coating method, body solder is usually suitable only for sheet steel and not for bonded connections. The use of body fillers further has the disadvantage that body fillers can become sunken or shrink and the seam can then shine through.

The object of the invention therefore is to provide an improved method for joining metallic surfaces.

This object is achieved by the features of claim 1.

Advantageous embodiments are defined in the dependent claims.

The core idea of the invention is a method for joining a first and second planar part each having an outer surface and an inner surface, wherein in a first step a lowered area is provided at two joining regions of the planar parts, which joining regions face each other, wherein the lowered areas are shaped in such a way that the level of the outer surface in the region of said lowered areas lies below the level of the outer surface of the adjacent regions of the particular planar parts, wherein in a further step the two planar parts are positioned in relation to one another, while an adhesive is used, in such a way that the two lowered areas together form a recess, wherein either in a first embodiment one joining region overlaps the other joining region and wherein the adhesive is provided directly between the overlapping joining regions or wherein in a second embodiment a joining aid is used, which at least partially overlaps the joining regions of the planar parts, wherein the adhesive is provided between each joining region of the two planar parts and the joining aid, wherein in a further step in the first embodiment a mechanical joint is installed in the region of the recess between the joining regions or in the second embodiment, if a joining aid is used, a mechanical joint is installed between the joining regions and the joining aid in order to provide an assembly connection, wherein in a further step the recess is filled with a filling mass in order to allow leveling with respect to the level of the outer surface of the adjacent regions of the respective planar parts. Preferably, the adhesive is cured before the filling with the filling mass.

In more detailed form, the invention therefore relates to a multistage method for joining a first and second planar part each having an outer surface and an inner surface, wherein in a first step a lowered area is provided on two facing joining regions of the planar parts. On the one hand, a lowering of the joining region of at least one planar part, for example, by means of an edge setter is conceivable here. On the other hand, provision by the factory of at least one planar part shaped in this way is also conceivable, in particular such that a lowered area is already provided at the joining region. Such an arrangement is conceivable particularly for a planar part used as a replacement part. Lowering in this case is preferably not to be understood as a joggling process as is used, for example, in forging technology. Rather, this should be understood preferably as the introduction of lower-lying regions or steps in one or more planar parts. Preferably, each lowered area of the joining regions is made as a continuous lowered area of the planar part, therefore particularly without interruptions. The lowered areas in this case are shaped in such a way that the level of the outer surface in the region of said lowered areas lies below the level of the outer surface of the adjacent regions of the particular planar parts.

In a further step, the two planar parts are positioned relative to one another with use of an adhesive in such a way that the two lowered areas form a recess, whereby in the aforesaid first embodiment one joining region overlaps the respectively other joining region and whereby the adhesive is provided directly between the overlapping joining regions of the planar parts or whereby in the above-described second embodiment a joining aid is used, which at least partially overlaps the joining regions of the planar parts, whereby the adhesive is provided between each joining region of the two planar parts and the joining aid. In the first embodiment, the adhesive is therefore provided between the outer surface of the one planar part in the region of the lowered area and the inner surface of the second planar part in the region of the lowered area, whereby it is conceivable in particular before the positioning to position the adhesive on one of these two regions or even on both regions. In the second embodiment in which the joining aid, preferably planar at least in regions, is used, particularly a connecting shoe, the adhesive can be provided between the joining aid and after the positioning of the joining aid with respect to the planar parts in each case on the outer or inner surfaces, facing to the joining aid, of both planar parts in the region of their lowered areas, whereby it is conceivable in particular before the positioning to position the adhesive on one of these two regions, on the joining aid, or even on a combination of the aforesaid regions. Preferably, in all embodiments all surfaces coming into contact with the adhesive are sanded and/or cleaned.

In a further step, a mechanical joint is used furthermore in the region of the recess between the joining regions or, if a joining aid is used, between the joining regions and the joining aid in order to provide an assembly connection. Accordingly, in the first embodiment the joining regions are connected directly to one another by means of the mechanical joint. This can occur, on the one hand, for example, by a clamping connection. It is conceivable, on the other hand, to provide or introduce corresponding openings or holes in the overlapping joining regions in order to connect both planar parts mechanically, for example, by means of a rivet connection or bolted connection. In the second embodiment, for example, both joining regions can each be connected by means of a clamping connection with the joining aid. It is conceivable here as well to use openings or holes in the joining aid and corresponding openings or holes in the joining regions, in order to connect both planar parts mechanically with the joining aid, for example, by means of a rivet connection or bolted connection. An arrangement of the planar parts has proven especially advantageous such that between the facing joining regions a space or gap is provided, through which a connecting means such as, for example, a screw or a rivet can be inserted in an opening or hole provided for this in the joining aid, whereby the head of the connecting means enables a fixation of the joining region(s) in regard to the joining aid, without an opening or hole having to be provided in the planar part. In all embodiments, when a mechanical joint is used, it is preferable to remove possibly escaping adhesive.

The adhesive can be preferably cured in a following step. This can occur depending on the type of adhesive, for example, by application of heat, by evaporation of a solvent, or also by a chemical reaction, particularly if a multicomponent adhesive is used. If screws or similar connecting means are used for the mechanical joint, it is conceivable to remove these after the curing of the adhesive. It is conceivable alternatively to provide a covering of the remaining connecting means such as, for example, rivets, by means of a sealing material. A qualified auto bodywork adhesive can be used for this purpose, for example. At this point in time, preferably cleaning of the joint can also occur and/or finishing with a corrosion inhibitor.

In a further step, the recess is filled with a filling mass in order allow leveling with respect to the level of the outer surface of the adjacent regions of the respective planar parts. This need not necessarily occur only after complete curing of the aforesaid adhesive. The adhesive is preferably cured partially or completely in such a way that a secure connection and fixing of the parts to be connected can be made possible. Complete curing within the meaning of a full-cure can also still occur, however, if the recess is already filled with the filling mass or together with the curing of the filling mass located the recess. Preferably, a body filler is used as the filling mass, particularly a two-component epoxy resin system, preferably with readily expansive properties. The curing of the filling mass can occur afterwards, which depending on the type of filling mass can occur, for example, by means of heat treatment. Preferably, a heating device is used in so doing, which is shaped in such a way that it can match the contour of the outer surface. A heating pad in particular is conceivable in this case. Other options are in particular the use of a radiant heater or an infrared heater.

Next, the outer surface, therefore the outer surface of the planar parts and the surface of the cured filling mass, can be tooled and particularly painted.

An improved option for joining metallic surfaces can be provided by a method of this kind, whereby, particularly by using lowered areas, a lower-lying region in the form of said recess can be provided to create sufficient space and in particular depth for the filling mass, as a result of which the visibility of the seam can be reduced. In addition, further reduction of the visibility of the seam is conceivable particularly with suitable finishing of the aforesaid outer surface.

Moreover, it has proven as especially advantageous to tool the outer surface, therefore the outer surface of the planar parts and the surface of the particularly cured filling mass, particularly by suitable sanding and/or polishing methods, in order to achieve a smooth and/or even surface.

It is of advantage, further, to paint the surface particularly after an above-described tooling step, which can occur in a multistage process known to the skilled artisan.

At least one metallic planar part is used in an advantageous refinement of the method, whereby its joining region is tooled by a cold forming method on the front side in the region of the lowered area before wetting by an adhesive. This is to be understood in particular the region around the free edge of said joining region. In this way, for example, an increase in the strength of the tooled joining region and/or a reduction of ductility can be achieved. This can occur, for example, by hammering of said region, as a result of which particularly the sharpness of said edge can be dulled and/or the entire tooled region can be compacted. The compacted surface structure arising due to cold forming can be irregular and wavy in its form. The thus produced surface can prevent solid particles of the adhesive and/or the filling mass from aligning on a straight, sharp edge. In addition, the risk of the later visibility of the edge can be reduced further by the irregular arrangement. Of course, other cold and also hot forming processes, known to the skilled artisan and suitable for this purpose, can be used as well, provided they lead to the same result.

Especially advantageous in this case is the use of two metallic planar parts, whereby both joining regions are tooled by a cold forming process, particularly as described in detail above, on the front side in the region of the lowered area before wetting by an adhesive.

In a variant, two metallic planar parts are used, whereby only a joining region on the front side in the region of the lowered area before wetting by an adhesive is tooled by a cold forming process, particularly as described in detail above. This makes sense particularly in repair work in which, for example, a damaged part of a planar part is separated, and the joining region of the remaining planar part is tooled as described above by a cold forming process. In contrast to the above-described variant, however, the new planar part, which for use as a replacement part for the defective part is not tooled by the cold forming process, but is worked on directly.

In an advantageous refinement, the recess and the recess-defining regions of the planar parts and optionally parts of the joining aid and remaining parts of the mechanical joint such as, for example, rivets or screws are provided with corrosion protection preferably after curing of the adhesive and before the introduction of the filling mass. In some cases, the corrosion protection can be used even if the adhesive is not completely cured, which can save time. For example, suitable as a corrosion inhibitor is a coating, as it is disclosed in EP 975439 B1, which in this respect supplements the present disclosure. Such coatings can be present, for example, soaked into cloths and thus serve as a rapid and simple method for the pretreatment of metals.

A further advantage is the furnishing of the joining aid and/or at least one planar part with at least one opening on the particular joining region, in order to provide an engagement region for the mechanical joint. On the one hand, similar openings can be drilled or punched, for example, immediately before the joining, for example. On the other hand, it is conceivable particularly for the joining aid and/or for planar parts, which are used as a replacement part, to use parts of this kind with prefabricated openings. Preferably, a plurality of openings are used, whereby the distance between the openings of a planar part and/or the joining aid, preferably the distance between the closest edges of adjacent openings, is in the range of 15 mm to 50 mm.

A further advantage is the use of a lowered area of at least one planar part, whose depth is in the range between one to three times the thickness of the planar part.

A further advantage is the use of a lowered area of at least one planar part, whose transition at its offset edge has a radius in the range of 0.5 mm to 6 mm. In one variant, the radius depends on the thickness of the planar part, which is lowered and is in a range between the single thickness of the planar part to the six fold thickness of the planar part. The offset edge in both preferred regions is preferably the edge where the lowered area on the planar part begins and becomes lower than the original level of the planar part.

In an advantageous refinement, a lowered area of at least one planar part has only one step or alternatively multiple steps. Preferably, the depth of the step lies in a range from the single to double thickness of the respective planar part.

In an advantageous refinement, it has proven expedient in addition to furnish the lowered area with a bevel. Preferably, the bevel has an angle in the range of 1° to 10°.

In a preferred embodiment, a multicomponent adhesive is used for gluing the planar parts. The advantage of multicomponent adhesives is the defined full-cure with sufficient mixing of the components.

Particularly suitable is the use of a two-component curable adhesive, as it is described particularly in WO 2011048022, which in this respect supplements the present disclosure, containing after mixing of the two components:
a) at least one epoxide,
b) at least one hardener reactive at room temperature for the epoxide,
c) particles having a core-shell structure,
d) at least one aliphatic polyalkylene ether, which has an amino group at each chain end, characterized in that component d) is different from component b) and is selected from homo- or copolymers of tetrahydrofuran, having aliphatic amino end groups and a weight average molar mass Mw of at least 1800, based on the polyethylene glycol standard.

The use of a two-component epoxy-based adhesive has proven especially advantageous. The use of a multicomponent auto bodywork adhesive has proven expedient particularly for use of a method of the invention in the auto bodywork sector. Suitable in this case, for example, is a two-component auto bodywork adhesive, which as a solvent-free, high-performance adhesive is used particularly in auto body repair for gluing body parts such as, for example, roof walls and side walls. For example, a gluing and simultaneously a sealing without the use of a primer can be made possible in one work step when such an adhesive or a similar adhesive is used.

A multicomponent filling mass is used in a preferred embodiment. The use of a two-component epoxy-based filling mass has proven especially advantageous in this regard. Preferably, the filling mass has readily expansive properties and/or no or at least only little shrinkage.

The use of a two-component filling mass is suitable in particular, as it is described in particular in EP 1672010 A1, which in this respect supplements the present disclosure, said mass containing, on the one hand, an epoxy component containing at least one epoxy resin, liquid at room temperature, and having at least 2 epoxy groups per molecule, at least one reactive diluent, fillers, and/or lightweight fillers, as well as propellants and optionally pigments, and, on the other hand, a hardener component containing at least one aliphatic polyaminoamide, at least one polyamino adduct based on triethylenetetramine, fillers, and/or lightweight fillers, and propellants, whereby the ratio of the polyaminoamide to the polyamino adduct is 1.5:1 to 3:1.

A further advantage is the use of the method of the invention as a repair method in the auto bodywork sector, whereby one planar part is part of the auto body and the other planar part is a replacement part which is connected to the auto body.

The subject matter of the present invention, moreover, is a joint or a connecting region, which was created according to a method of claim 1, particularly comprising the preceding features.

Accordingly, a further core idea of the present invention is the provision of a connecting region of a first and second planar part each having an outer surface and an inner surface particularly by means of the above-described method, wherein the two planar parts have lowered areas at the joining regions, wherein the planar parts are positioned such that the two lowered areas form a recess, wherein either one joining region overlaps the other joining region and wherein an adhesive is provided directly between the overlapping joining regions or a joining aid is used, which at least partially overlaps the joining regions of the planar parts, wherein the adhesive is provided between each joining region of the two planar parts and the joining aid, and wherein the recess is filled with a filling mass.

In this case, it is conceivable, on the one hand, that the connecting region further has parts of a mechanical joint as described above, particularly an opening or hole in one or both planar parts and/or the joining aid. On the other hand, the connecting region can also have a complete mechanical joint, whereby the part, lying within the recess, of the mechanical joint is preferably covered by means of the filling material.

In particular, the connecting region can have all features mentioned in regard to the above method.

The invention will be described below with use of a number of exemplary embodiments. In the drawing.

Basically, the method of the invention can be used in general for joining surfaces, particularly made of sheet metal. In the shown exemplary embodiments, the method of the invention is used by way of example as a repair method for vehicle bodies. Shown in each case is a partial view of a vehicle body in which a part, damaged by an accident, for example, has already been separated from the rest of the preferably undamaged auto body, in order to be able to insert a replacement part for the damaged part and to connect it to the auto body. Because in the shown exemplary embodiment an auto body made of sheet steel is worked on, the undamaged auto body part is labeled as auto body sheet metal 10, and the replacement part in turn as replacement sheet metal 20. Nevertheless, the use of a method of the invention in the case of other materials is also conceivable, particularly light metals, plastics, or composite materials.

Figure 1:
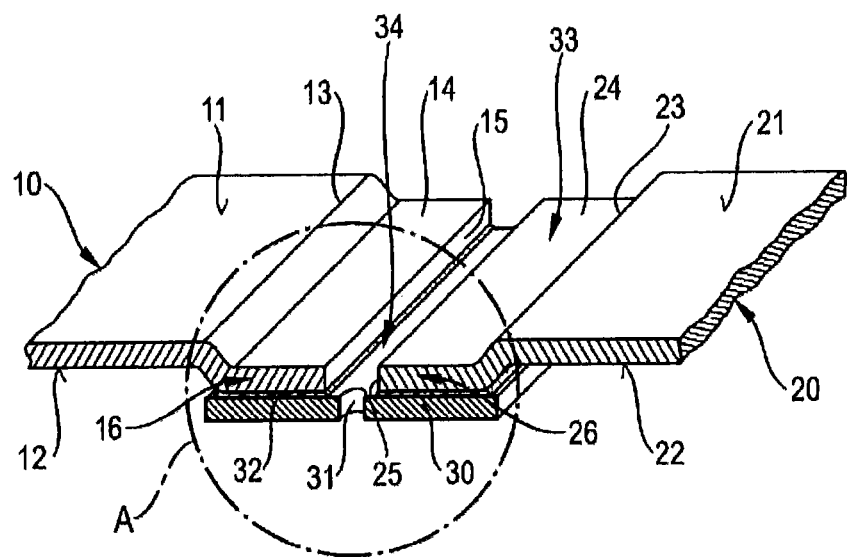
FIG. 1 shows a sectional view of a structure consisting of a first and second planar part during the joining by means of the method of the invention.

FIG. 1 shows a sectional view of a structure consisting of an auto body sheet metal 10 as the first planar part and replacement sheet 20 as the second planar part during the joining by means of the method of the invention. Therefore, the method of the invention has not yet been completed. As described above, a defective planar part has been separated and removed from auto body sheet metal 10, so that auto body sheet metal 10 has a free edge 15. Replacement part 20, which is to be connected to auto body sheet metal 10 by means of the method of the invention, is intended to represent a replacement for the defective planar part. Auto body sheet metal 10 has an outer surface 11 and an inner surface 12. Accordingly, replacement part 20 has an outer surface 21 and an inner surface 22. Originally, outer surface 11 was provided with a surface layer (not shown), particularly comprising paint, but it was already removed from the shown part of auto body sheet metal 10.

Auto body sheet metal 10 has a lowered area 14 which extends from an offset edge 13 in the direction of free edge 15. After separation of the damaged part, auto body sheet metal 10 has been lowered here by means of an edge setter in a process step in such a way that the level of outer surface 11 in the region of said lowered area 14 lies below the level of outer surface 11 of the adjacent regions, therefore of the original level of auto body part 10. Offset edge 13 in this case has a radius of 1 mm, the depth of lowered area 14 is preferably at least the single thickness of auto body sheet metal 10, in the present exemplary embodiment approximately the single thickness. Further, the front region, lying in the direction of free edge 15, of auto body sheet metal 10 has been tooled by a cold forming process. In the shown exemplary embodiment, this region has been hammered in order to achieve an increase in the strength of this region and/or a decrease in ductility and to dull the sharpness of free edge 15.

Replacement sheet metal 20 in turn also has a free edge 25, which extends corresponding to free edge 15 of auto body sheet metal 10 and in the shown position of replacement sheet metal 10 lies opposite free edge 15. A corresponding extension in this case is preferably to be understood as a course or form such that both edges 15, 25 in the shown position extend preferably over their entire length at a more or less constant distance to one another, so that based on the shown arrangement of auto body sheet metal 10 and replacement sheet metal 20, shown spaced apart in areas, a regular gap 34 is present between the two free edges 15, 25.

Further, replacement sheet metal 20 has a lowered area 24, which extends from an offset edge 23 in the direction of free edge 25. After replacement sheet metal 20 of a suitable size has been separated from a sheet metal stock (not shown), replacement sheet metal 20 has been lowered here by means of an edge setter in a process step such that the level of outer surface 21 in the region of said lowered area 24 lies below the level of outer surface 21 of the adjacent regions, therefore of the original level of auto body part 20. Offset edge 23 here as well has a radius of 1 mm, and the depth of lowered area 24 is preferably at least the single thickness of replacement sheet metal 20, in the present exemplary embodiment approximately the single thickness. Nevertheless, it is also conceivable to use a replacement sheet metal 20 that is already available at the factory in a preferred size and, moreover, already has the described lowered area 24 at the factory. In this case, an active introduction of a lowered area 24 in replacement sheet metal 20 is not necessary at this time. In the case of replacement sheet metal 20 as well, the front region, lying in the direction of free edge 25, has already been tooled by a cold forming process. Here as well, this region has been preferably hammered to achieve an increase in the strength of this region and/or a decrease in ductility and to dull the sharpness of free edge 25. This step as well need not necessarily occur before the insertion of replacement sheet metal 20, but can occur, for example, at the factory during the production of a replacement sheet metal 20 as a standard replacement part.

As shown in FIG. 1 and mentioned above, auto body sheet metal 10 and replacement sheet metal 20 are positioned to one another such that a gap 34 is provided between free edges 15, 25. In addition, lowered areas 14, 24 together form a recess 33, which may also include gap 34, provided it is not filled by a connecting means not shown in FIG. 1. The shown positioning of auto body sheet metal 10 and replacement sheet metal 20 occurs with use of an adhesive 32 and a connecting shoe 30 as a joining aid. Connecting shoe 30 in the present exemplary embodiment is a planar part made of sheet metal, which is dimensioned such that, in the shown position of auto body sheet metal 10 and replacement sheet metal 20 to one another, it is approximately as large as the total area of the two lowered areas 14, 24 together and gap 34. Connecting shoe 30 comes into contact with inner surfaces 12, 22 in the region of lowered areas 14, 24 of auto body sheet metal 10 or replacement sheet metal 20, whereby a layer of adhesive 32 is provided between connecting shoe 30 and inner surfaces 12, 22. Therefore, the region of lowered areas 14 of auto body sheet metal 10 is also called joining region 16 of auto body sheet metal 10, and the region of lowered area 24 of replacement sheet metal 20 is also called joining region 26 of replacement sheet metal 20. Before wetting with adhesive, it can be expedient to sand auto body sheet metal 10 and/or replacement sheet metal 20 and/or connecting shoe 30 at least in the regions coming into contact with adhesive 32 and to free them from coatings that are present and/or to clean and/or to degrease them.

A two-component epoxy-based auto bodywork adhesive is used as adhesive 32, as it is described particularly in WO 2011048022. The adhesive in this case was applied to the surface of connecting shoe 30 before the placement of connecting shoe 30. Thus, connecting shoe 30, which in each case at least partially overlaps joining regions 16, 26 of auto body sheet metal 10 or of replacement sheet metal 20, is used as a joining aid as described, whereby adhesive 32 in the shown positioning is provided in each case between joining regions 16, 26 and connecting shoe 30.

Because curing of adhesive 32 is necessary for fixing the position of auto body sheet metal 10 and replacement sheet metal 20 to one another, the method of the invention provides for a mechanical joint to provide an assembly connection. For this purpose, connecting shoe 30 in the present exemplary embodiment is provided with a plurality of holes 31 in order to provide an engagement region for a mechanical connecting means, therefore for the mechanical joint. Holes 31 are arranged such that in the shown positioning of the components to one another they lie within gap 34 between free edges 15, 25 and are accessible through gap 34. In this case, gap 34 and/or holes 31 are preferably configured such that the gap is slightly greater than the diameter of holes 31, preferably such that each hole 31 is freely accessible through gap 34 by means of a mechanical connecting means. The distance of individual holes 31 to one another in the shown exemplary embodiment is 35 mm and in general for carrying out the method of the invention it is preferably in the range of 15 mm to 50 mm.

Figure 2:
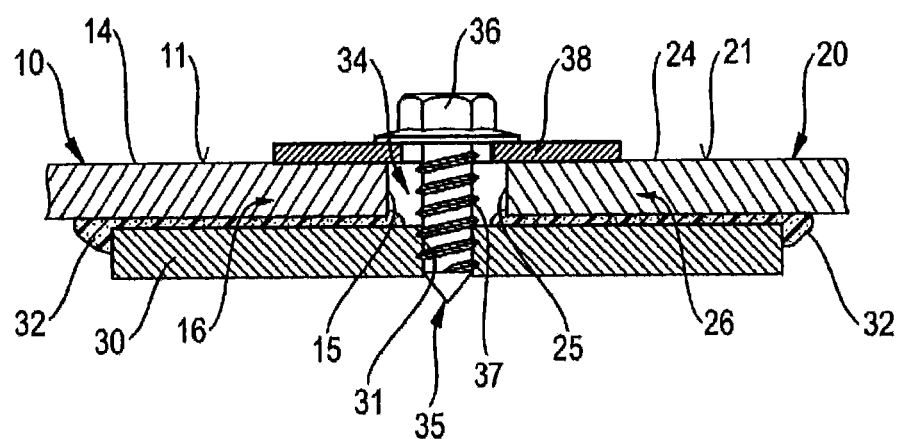
FIG. 2 shows a sectional view of a detail of the structure of FIG. 1 in a further process step.

FIG. 2 shows a sectional view of a detail A of the structure of FIG. 1 in another process step. In this case, connecting shoe 30 has been shown somewhat narrower, however, than in FIG. 1. After auto body sheet metal 10 and replacement sheet metal 20 have been placed in the desired position to one another and connecting shoe 30 is mounted with adhesive 32, a self-tapping sheet metal screw 35 is used as a connecting means for the mechanical joint. In this case, the size of self-tapping sheet metal screw 35 is selected such that external thread 37, provided on self-tapping sheet metal screw 35, does not touch free edges 15, 25 in the region of gap 34, but cuts into the wall of a hole 31 of connecting shoe 30. Providing hole 31 with an internal thread can be omitted in this way. Before self-tapping sheet metal screw 35 is screwed in, a flat washer 38 is provided, which is dimensioned such that a screw head 36 presses flat washer 38 onto outer surfaces 11, 21 of both lowered areas 14, 24 during the screwing in of self-tapping sheet metal screw 35, in order to press together the inner surface at joining regions 16, 26 of auto body sheet metal 10 and of replacement sheet metal 20 and connecting shoe 30 with adhesive 32 to provide an assembly connection, particularly to be able to allow curing of adhesive 32 and a secure bonded connection of the parts to one another by means of adhesive 32. It is preferable to wipe away adhesive 32 that may escape when self-tapping sheet metal screws 35 are screwed in. Instead of flat washer 38 other suitable force transmitting means may also be used, particularly suitable brackets or bridge-shaped parts. Next, adhesive 32 is cured, whereby, for example, the use of an infrared heater or a suitable heating pad for heating the structure can be useful.

Figure 3:
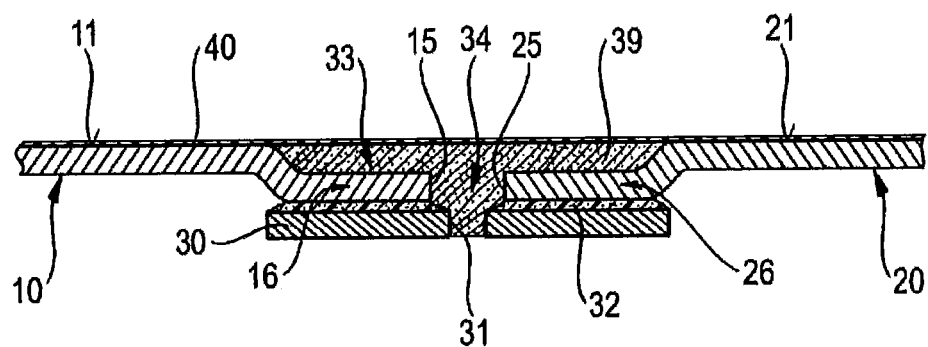
FIG. 3 shows a sectional side view of the structure from FIG. 1 after completion of the method.

FIG. 3 shows a sectional side view of the structure in FIG. 1 after the method of the invention has been completed, therefore a connecting region of the invention. After adhesive 32 has cured, self-tapping sheet metal screw 35 shown in FIG. 2 and flat washer 38 are removed. Further, residues of adhesive 32 are removed from hole 31 and gap 34. Subsequently, outer surface 11, 21 particularly in the area of joining regions 16, 26 and free edges 15, 25 at gap 34 are treated with a corrosion protection. Suitable for this purpose, for example, is a coating, as it is disclosed in EP 975439 B1, which in this respect supplements the present disclosure. Such coatings can be present, for example, soaked into cloths and thus serve as a rapid and simple method for the pretreatment of metals. The cloths make the pretreatment easier and thus ensure more rapid throughput times. Recess 33, gap 34, and preferably holes 31 as well are subsequently filled free from air using a filling mass 39 in order to allow leveling particularly of recess 33 to the level of outer surface 11, 21 of the adjacent regions with respect to lowered areas 14, 24 of auto body sheet metal 10 and of replacement sheet metal 20. For example, a suitable filling mass 39 is one that is used as a body filler for repairing auto body damage and is described in particular in EP 1672010 A1. The product can be processed at room temperature and then cured with an infrared heat source at preferably 60 to 80° C. The use of, for example, a heat source for heating the structure has proven useful for curing filling mass 39, whereby in the shown exemplary embodiment a heating pad (not shown) is used, which can be adapted to the contour of the structure, provides the necessary curing temperature for the required curing time, and gives off its heat in the direction of sheet metal parts 10, 20, so that the environment is not heated significantly. This has proven especially advantageous, because the covering of filling mass 39 during the curing process provides protection from mechanical and other influences. Alternatively, a different heat source, such as, for example, a radiant or infrared heater, can also be used for curing filling mass 39.

After filling mass 39 has cured, the outer surface of filling mass 39 and the adjacent regions of outer surfaces 11, 21 have already been worked on in the shown exemplary embodiment and particularly painted, which results in a surface layer 40. In so doing, conventional work steps are used, such as, for example, sanding, leveling out, filling, priming, painting with a base coat, and painting with a clear coat.

Figure 4:
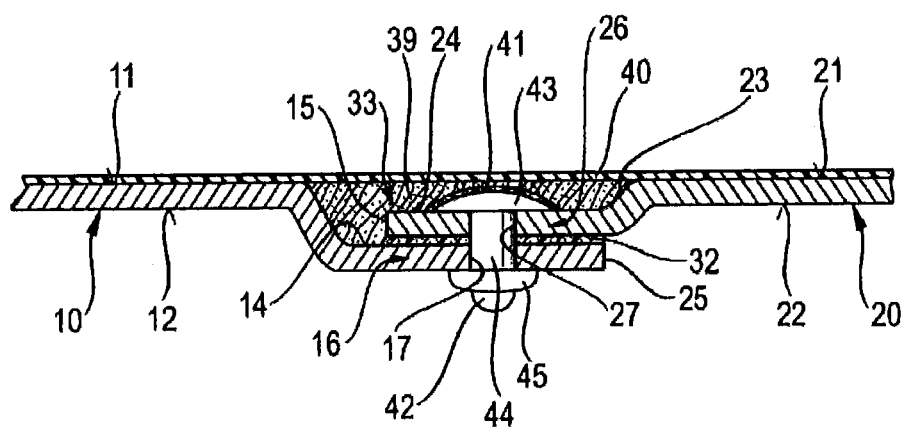
FIG. 4 shows a sectional side view of a variant of a structure after completion of the method.

FIG. 4 shows a sectional side view of a variant of a structure after the method of the invention has been completed, therefore an alternative connecting region of the invention. The method used here is basically comparable to the method that led to the structure shown in FIG. 3. Thus, here as well auto body part 10 as the first planar part and replacement part 20 as the second planar part are connected or joined to one another. Both auto body part 10 and replacement part 20 have been provided, in addition, with lowered areas 14, 24, whereby the radius of the lowered area at the respective offset edges 13, 23 is 2 mm in each case, so that the level of outer surfaces 11, 21 in the region of these lowered areas 14, 24 lies below the level of outer surface 11, 21 of the adjacent regions of the respective planar parts. It must be taken into account here that lowered area 14 of auto body part 10 has approximately a depth of twice the thickness of auto body sheet metal 10, and lowered area 24 of replacement part 20 in turn only a depth of approximately the single thickness of replacement sheet metal 20. Both auto body sheet metal 10 and replacement sheet metal 20 in this case have the same thickness. The different depth of recesses 14, 24 is explained by the depicted positioning of auto body sheet metal 10 and of replacement sheet metal 20 to one another. Both metal sheets 10, 20 overlap one another such that joining region 26 of replacement sheet metal 20 with inner surface 22 lies on outer surface 11 of joining region 16 of auto body sheet metal 10, so that here as well both lowered areas 14, 24 form a recess 33. For a bonded connection of both metal sheets 10, 20, adhesive 32, here as well preferably the above-described two-component epoxy-based auto bodywork adhesive, is provided in the space between overlapping joining regions 16, 26. In contrast to the exemplary embodiment in FIGS. 1 to 3, therefore, no connecting shoe is used as a joining aid.

The corresponding front regions, lying in the direction of the respective free edges 15, 25, of the respective joining regions 16, 26 of auto body sheet metal 10 and of replacement sheet metal 20 were tooled further by a cold forming process by hammering, preferably after the lowering and after the depicted positioning with use of adhesive 32. Further, both joining regions 16, 26 were provided with holes 17, 27 corresponding to one another in the depicted position. These are to be understood as holes 17, 27 preferably of the same diameter, which are arranged concentrically to one another in the shown overlapping state of joining regions 16, 26. In this case, a plurality of holes 17, 27 are provided, preferably at the distance of 20 mm of a hole 17, 27 to the next same metal sheet 10, 20. Holes 17, 27 serve to provide a mechanical joint in the region of recess 33 to provide an assembly connection for the curing of adhesive 32, whereby a rivet 42 is used in the shown exemplary embodiment. Rivet 42 in this case runs with a rivet shank 44 through hole 27 of replacement sheet metal 20 and hole 17 of the underlying auto body sheet metal 10, whereby a factory head 43 of rivet 42 lies on outer surface 21 of joining region 26 of replacement sheet metal 20 and a buck-tail 45 on inner surface 12 of joining region 16 of auto body sheet metal 10. Rivet 42 presses overlapping joining regions 16, 26 together, particularly to make possible curing of adhesive 32 and a secure bonded connection of metal sheets 10, 20 to one another by means of adhesive 32. It is preferable to wipe off adhesive 32 which may escape during the fastening of rivet 42. Adhesive 32 is cured thereafter as described above.

A further difference to the above-described exemplary embodiment is that rivet 42 has not been removed from holes 17, 27, particularly not after curing of adhesive 32. Rather, preferably immediately after the securing factory head 43 and the directly adjacent regions of outer surface 21 of joining region 26 are provided with an adhesive 41, particularly to be able to provide corrosion protection. Here as well, the above-described two-component epoxy-based auto bodywork adhesive can be used, so that preferably adhesive 32 and adhesive 41 can be cured together. After curing of adhesives 32, 41, outer surface 11, 21 particularly in the area of joining regions 16 can be treated with a corrosion protection, for example, with a coating, as is disclosed in EP 975439 B1. Recess 33 further is subsequently filled free from air with use of the above-described filling mass 39 in order to allow a leveling particularly of recess 33 to the level of outer surface 11, 21 of the adjacent regions of auto body sheet metal 10 and of replacement sheet metal 20. After curing of filling mass 39, outer surface of filling mass 39 and the adjacent regions of outer surfaces 11, 21 are handled as described above and particularly painted, which results in a surface layer 40.

Figure 5:
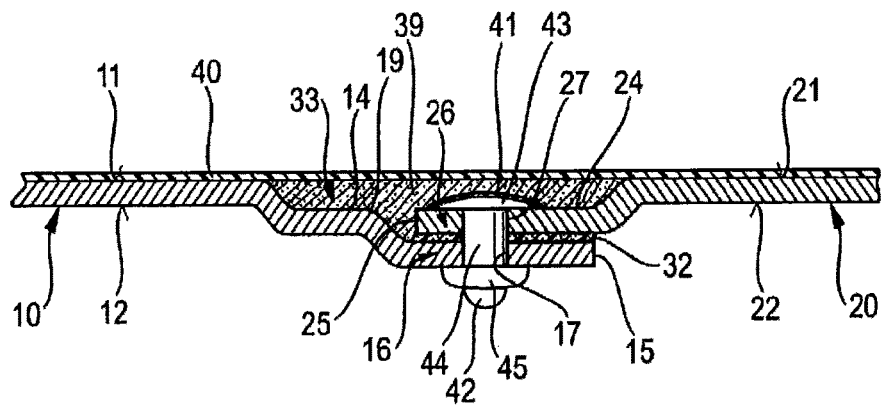
FIG. 5 shows a sectional side view of a further variant of a structure after completion of the method.

FIG. 5 shows a sectional side view of another variant of a structure after completion of the method of the invention, therefore an alternative connecting region of the invention. The method for producing the depicted structure from auto body sheet metal 10 and replacement sheet metal 20 basically corresponds to the method for the structure in FIG. 4, so that reference is made here to the above description, which in this respect supplements the description of the exemplary embodiment shown in FIG. 5. A difference, however, is the design of lowered area 14 of auto body sheet metal 10, which has a step 19, so that lowered area 14 is divided into two regions having a different depth. The front region leads to free edge 15 and has a depth corresponding to double the thickness of auto body sheet metal 10. This region represents joining region 16 of auto body sheet metal 10, on whose outer surface 11 joining region 26 of replacement sheet metal 20 is placed in the shown position, whereby here as well an adhesive 32 is again provided between joining regions 16, 26. Joining regions 16, 26 therefore overlap in this first region of lowered area 14. Said first region of lowered area 14 ends in step 19 on the side facing away from free edge 15 and merges into a second region, which, like lowered area 24 of replacement sheet metal 20, only has a depth corresponding to the single thickness of auto body sheet metal 10. Both auto body sheet metal 10 and replacement sheet metal 20 in this case have the same thickness. Outer surface 21 of joining region 26 of replacement sheet metal 20 therefore lies approximately in a plane with outer surface 11 of joining region 16 of the second region of lowered area 14 of auto body sheet metal 10. Thus, for example, a uniform thickness of filling mass 39 can be made possible. After the method has been completed, here as well the outer surface of filling mass 39 and the adjacent regions of outer surfaces 11, 21 are handled as described above and painted in particular, which results in a surface layer 40.

Figure 6:
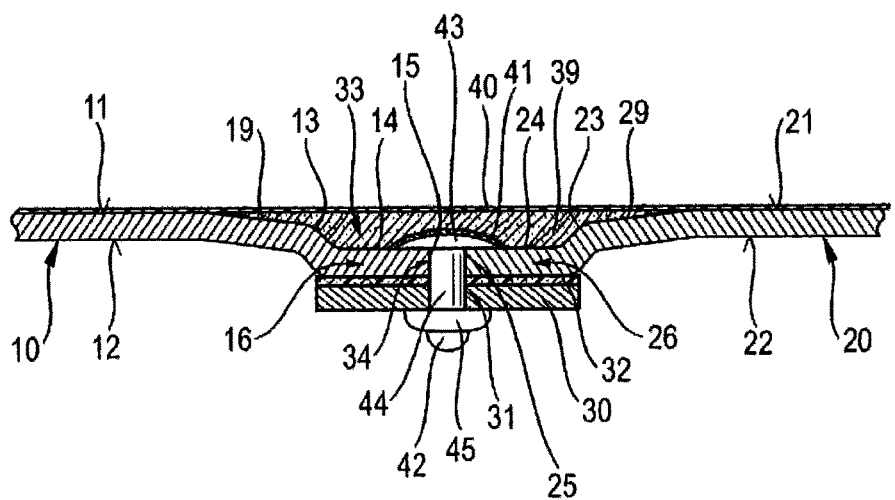
FIG. 6 shows a sectional side view of a third variant of a structure after completion of the method.

FIG. 6 shows a sectional side view of a third variant of a structure after completion of the method of the invention, therefore an alternative connection region of the invention. The method for producing the shown structure of auto body sheet metal 10 and replacement sheet metal 20 basically corresponds to the method for the structure in FIGS. 1 to 3, so that reference is made here to the above description, which in this respect supplements the description of the exemplary embodiment shown in FIG. 6. A difference is the design of lowered areas 14, 24 of auto body sheet metal 10 and of replacement sheet metal 20. Corresponding bevels 19, 29, which enable a smooth transition of lowered areas 14, 24 to the corresponding original level of outer surfaces 11, 21 of metal sheets 10, 20, join with respective offset edges 13, 23, in which each of lowered areas 14, 24 end. The angle of bevels 19, 29 to the respective original level of outer surfaces 11, 21 of sheet metal 10, 20 in the shown exemplary embodiment is 3° in each case. In general, angles in a range of 1° to 10° are used preferably for similar bevels. A further difference is that instead of the self-tapping sheet metal screw a rivet 42 is used, which with its rivet shank 44 runs through gap 34 between the two facing free edges 15, 25 and extends through hole 31 of connecting shoe 30. Factory head 43 in the installed state lies on outer surfaces 11, 21 of lowered areas 14, 24, therefore, outer surfaces 11, 21 of joining regions 16, 26 of auto body sheet metal 10 or of replacement sheet metal 20. Buck-tail 45 in turn is positioned on the bottom side of connecting shoe 30 such that joining regions 16, 26 and connecting shoe 30 are pressed together to provide an assembly connection, particularly to ensure curing of adhesive 32 and a secure bonded connection of the parts to one another by means of adhesive 32.

As in the exemplary embodiments in FIGS. 4 and 5, here as well rivet 42 remains in its position and is embedded by means of filling mass 39 after the above-described processing. After filling mass 39 cures, here as well the outer surface of filling mass 39 and the adjacent regions of outer surfaces 11, 21 are handled as described above and painted in particular, which results in a surface layer 40.

| | |
|---|---|
| 10 | Auto body sheet metal |
| 11 | Outer surface |
| 12 | Inner surface |
| 13 | Offset edge |
| 14 | Lowered area |
| 15 | Free edge |
| 16 | Joining region |
| 17 | Hole |
| 18 | Step |
| 19 | Bevel |
| 20 | Replacement sheet metal |
| 21 | Outer surface |
| 22 | Inner surface |
| 23 | Offset edge |
| 24 | Lowered area |
| 25 | Free edge |
| 26 | Joining region |
| 27 | Hole |
| 29 | Bevel |
| 30 | Connecting shoe |
| 31 | Hole |
| 32 | Adhesive |

| | |
|---|---|
| 33 | Recess |
| 34 | Gap |
| 35 | Self-tapping sheet metal screw |
| 36 | Screw head |
| 37 | External thread |
| 38 | Flat washer |
| 39 | Filling mass |
| 40 | Surface layer |
| 41 | Adhesive |
| 42 | Rivet |
| 43 | Factory head |
| 44 | Rivet shank |
| 45 | Buck-tail |

The invention claimed is:

1. A method for joining first and second planar parts, each of the planar parts having an outer surface and an inner surface, the method comprising:
providing a lowered area at two joining regions of the planar parts, which the joining regions face each other, wherein the lowered areas are shaped in such a way that the level of the outer surface in the region of the lowered areas lies below the level of the outer surface of the adjacent regions of the planar parts;
positioning the two planar parts in relation to each other in such a way that the two lowered areas form a recess, wherein either (a) one joining region having a plurality of holes defined thereon overlaps the other joining region having a plurality of holes defined thereon so that at least some of the joining region holes are aligned and an adhesive is disposed between the overlapping joining regions or (b) the joining regions are separated by a gap and a joining aid having a plurality of holes defined thereon is provided and at least partially overlaps the joining regions of the planar parts so that at least some of the holes are aligned with the gap, and the adhesive is provided between each joining region of the two planar parts and the joining aid;
disposing a mechanical connector through aligned joining region holes in the recess between the joining regions or, if a joining aid is used, between the gap and through the joining aid hole to provide an assembly connection; and
filling the recess with a filling mass to allow leveling with respect to the level of the outer surface of the adjacent regions of the planar parts.

2. The method according to claim 1, wherein at least one said planar part is metallic, whereby its joining region is formed by a cold forming process on the front side in the region of the lowered area before contact by the adhesive.

3. The method according to claim 2, wherein the two planar parts are metallic, whereby both joining regions are tooled by the cold forming process on the front side in the region of the lowered area before contact by the adhesive.

4. The method according to claim 1, comprising the step of providing the recess and regions defining the recess of the planar parts with corrosion protection, after curing of the adhesive and before filling with the filling mass.

5. The method according to claim 1, wherein the lowered area of at least one planar part has a step or multiple steps.

6. The method according to claim 1, wherein the depth of the lowered area of at least one planar part is in the range between one to three times a thickness of that planar part.

7. The method according to claim 1, wherein the adhesive is a multicomponent adhesive and/or the filling mass is a multicomponent filling mass.

8. The method according to claim 1, used to repair automotive bodywork sector.

9. The method according to claim 1, wherein one planar part is a part of an auto body and the other planar part is a replacement part for the auto body.

10. A connecting region of first and second planar parts, each of the planar parts having an outer surface and an inner surface, wherein the two planar parts have lowered areas on joining regions, wherein the planar parts are positioned such that the two lowered areas form a recess, wherein either (a) one joining region having a plurality of holes defined thereon overlaps the other joining region having a plurality of holes defined thereon and an adhesive is provided directly between the overlapping joining regions or (b) a joining aid having a plurality of holes defined thereon is used, which at least partially overlaps the joining regions of the planar parts, wherein the adhesive is provided between each joining region of the two planar parts and the joining aid, and wherein the recess is filled with a filling mass.

* * * * *